May 13, 1969     A. C. CHRISTY     3,443,332
APPARATUS FOR WRITING WITH HAND MANIPULATED LIGHT SOURCE
Filed Jan. 26, 1967
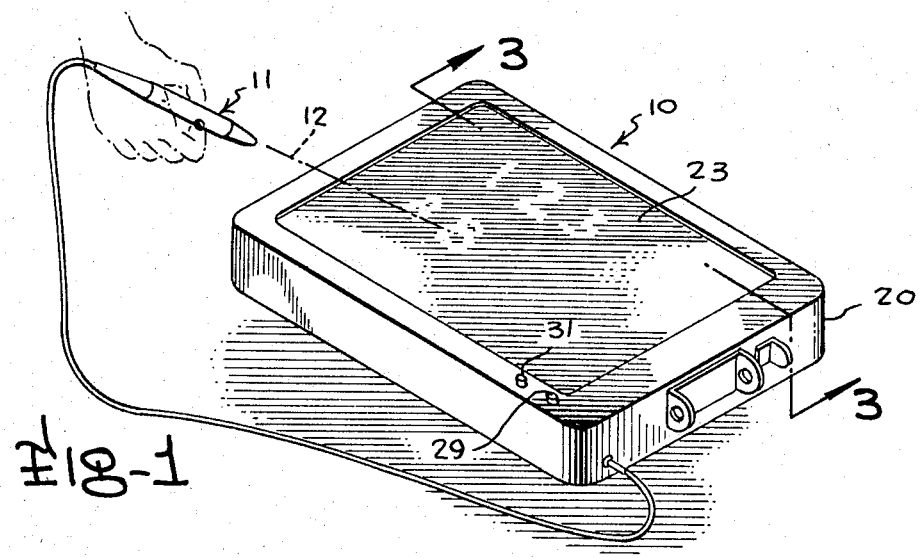
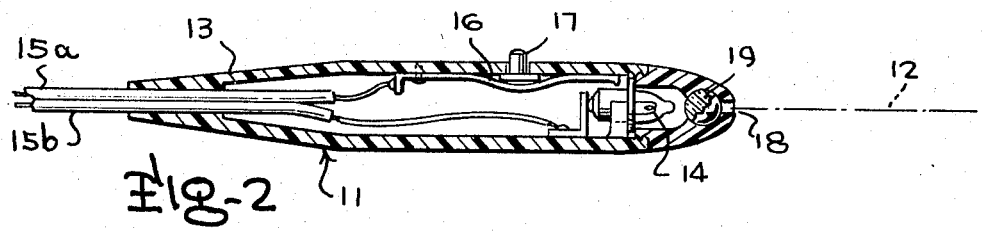
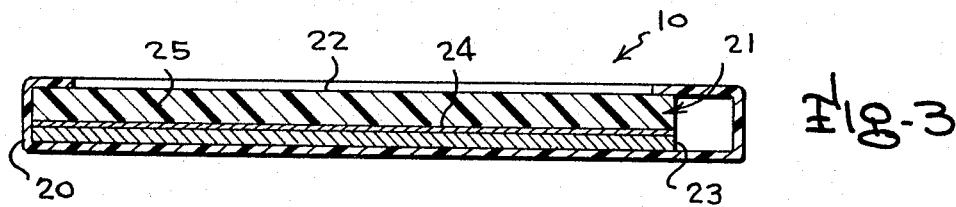
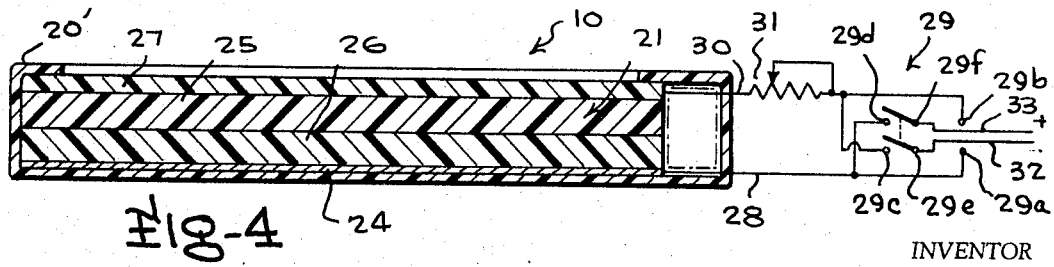
INVENTOR
ALEXANDER C. CHRISTY
BY Mason, Fenwick & Lawrence
ATTORNEYS

United States Patent Office 3,443,332
Patented May 13, 1969

3,443,332
APPARATUS FOR WRITING WITH HAND
MANIPULATED LIGHT SOURCE
Alexander C. Christy, Box 2098 Westover,
Morgantown, W. Va. 26505
Filed Jan. 26, 1967, Ser. No. 611,875
Int. Cl. B43l 1/12; G09f 13/20
U.S. Cl. 40—134                                    14 Claims

ABSTRACT OF THE DISCLOSURE

Electroluminescent writing apparatus including a substantially pencil-shaped writing member providing a source of electromagnetic radiation, adapted to be held in the hand and generate a narrow cross-section beam, such as a light beam, of appropriate frequency to excite phosphorescent material to emit visible light, and a stationary exhibiting unit in the form of a generally panel-shaped body containing a phosphorescent material defining a substantially flat viewing screen or surface of substantial area, the phosphorescent material being locally excited by the beam to generate visible light patterns in accordance with the movement of the writing member. A reflective backing may be provided to enhance light generation in the phosphorescent material and a photovoltaic semi-conductor layer may underlie the phosphorescent material and be biased to further enhance light production.

---

The present invention relates in general to apparatus for producing visible writing with a hand manipulated source of incident radiation in the visible light or adjacent regions of the electromagnetic spectrum, and more particularly to writing apparatus including a stationary exhibiting unit having an exhibiting surface of phosphorescent material to be excited by a beam of incident radiation in the visible or adjacent regions of the electromagnetic spectrum produced by a generally pencil-shaped device for producing visible writing, designs, graphic characters and like patterns on the surface of the exhibiting body for a selected persistence period.

The apparatus of the present invention lends itself to a wide variety of applications, particular examples of which are as toys, amusement apparatus, educational applications, advertising and public exhibiting, and as readily erasable doodle pads.

An object of the present invention is the provision of a novel apparatus for producing visible writing on a surface of a phosphorescent exhibiting body by manipulation of a manually held pencil-like device held in the hand of the user and producing a beam of exciting radiation for activating the phosphorescent material.

Another object of the present invention is the provision of a novel writing apparatus wherein writing or graphic designs are rendered visible for a selective persistence period on a surface of a phosphorescent exhibiting body by a manually manipulatable device generating a concentrated beam of an exciting radiation in the visible or near visible light regions of the electromagnetic spectrum.

Another object of the present invention is the provision of writing apparatus of the type described in the immediately preceding paragraph wherein the persistence and intensity of the luminous image produced on the exhibiting surface by the exciting radiation beam can be readily controlled.

Another object of the present invention is the provision of a novel apparatus of a type described in the preceding paragraphs, wherein photovoltaic semi-conductor means compounded with phosphorescent materials is employed to facilitate control of persistence and intensity of the luminous image and to facilitate erasing or extinguishing thereof.

Other objects, advantages and capabilities of the present invention will become apparent from the following detailed description, taken in conjunction with the accompanying drawings illustrating a preferred embodiment of the invention.

In the drawings:

FIGURE 1 is a perspective view of apparatus for writing by use of a visible light beam embodying the present invention;

FIGURE 2 is a somewhat diagrammatic section view of the exciting radiation generating pencil component of the apparatus of the present invention;

FIGURE 3 is a section view of one form of exhibiting unit for the apparatus; and, FIGURE 4 is a section view of another form of phosphorescent exhibiting unit of the apparatus of the present invention.

Referring to the drawings, wherein like reference characters designate corresponding parts throughout the several figures, the apparatus of the present invention involves two principal components, the phosphorescent exhibiting unit, indicated generally by the reference character 10, and the exciting radiation generating pencil member, indicated by the reference character 11. The pencil member 11 may take many forms, and may be designed to produce exciting radiation appropriate to the phosphorescent composition employed in the exhibiting unit 10, as will be well-known to persons skilled in the art, lying in various frequency bands of the electromagnetic spectrum.

In the particular embodiment herein described, the pencil member 11 is designed to produce a beam of light, indicated diagrammatically at 12, in the visible light range of the electromagnetic spectrum and is preferably incorporated in a substantially pencil-shaped housing or case 13 for convenience of manipulation by the hand of the operator.

The housing or case 13 may be made of any desired material, such as metal or plastic, molded to the desired configuration, and providing a hollow interior or appropriately shaped cavities therein to support an incandescent lamp 14, the center terminal of which is connected, as by direct engagement with a fixed contact within the housing 13, to one of the supply conductors of the supply conductor pair 15a, 15b for the pencil member 11, while while the peripheral or other terminal of the incandescent lamp 14 is selectively connected to the other of the supply conductors 15a, 15b through a spring contactor of conventional construction, indicated by reference character 16, which is normally resiliently urged out of contact with the incandescent lamp terminal but may be manually depressed into circuit-making contact with the incandescent lamp 14 by a control switch or push button 17 movably supported in the casing 13. The light emitting end of the casing 13 is suitably apertured as indicated at 18 and the light generated by the incandescent lamp 14 is concentrated into a narrow beam of light exiting through the opening 18 by suitable lens means, such as a lens bead or spherical optical body, formed either of glass or plastic, appropriately shaped to focus the light into a concentrated beam. In the embodiment illustrated, and for simplicity of manufacture, this is accomplished by the spherical lens bead 19 illustrated in FIGURE 2. In this illustrative embodiment, the pencil member 11 is connected to the exhibiting unit 10 by the supply conductor 15a, 15b, preferably formed as a two-conductor cable, connected at its other end in a conventional manner across suitable batteries mounted in the exhibiting unit 10. Of course, instead of using batteries as the energy source for the incandescent lamp or other exciting radiation generating device, two-conductor cable can be connected independently of the exhibiting unit 10 or through the exhibiting unit 10, to a conventional alternating current voltage supply, or at an appropriate transformer and thence to the alternating current supply.

Referring to the exemplary embodiment of the exhibiting unit 10 illustrated in FIGURE 3, the exhibiting unit 10 comprises a generally panel-shaped, substantially rectangular case or frame 20, defining a peripheral frame or encasement for the phosphorescent body 21, the exhibiting or incident surface 22 of which forms the screen on which the light writing is to appear. The phosphorescent body 21 in this example is formed of laminar or sandwich-like construction on a base 23, which may be metal, plastic, cardboard, or the like, having a reflective coating 24 formed thereon such as by spraying, for example a coating of titanium oxide compound in a solution of an adhesive base. Superimposed on the reflective coating 24 is the luminescent phosphorous layer 25, which may be formed of a phosphor compound in a transparent plastic, or a phosphorescent compound applied by a spraying or sedimentation process, for example, approximately 3 to 4 mils thick over the reflective coating 24.

A further modification is illustrated in FIGURE 4, wherein the exhibiting body is indicated by the reference character 10' having a similar case or frame 20' like that employed in the embodiment of FIGURE 3, the reflective coating 24 in this instance being an electrically conductive reflective backing, formed for example of the metal of the frame 20', or of a suitable metal, plastic, cardboard or the like base, having a similar reflective coating 24 deposited thereon, which must be electrically conductive if the cardboard or non-conductive plastic material is employed for the base. The phosphorescent layer 25 in this embodiment is spaced forwardly from the reflective coating 24, the intervening space being occupied by a layer or coating of photovoltaic semi-conductor material indicated at 26, compounded or incorporated with phosphorescent material, and the exhibiting or incident surface of the phosphorescent layer 25 is overlaid with a transparent coating of electrically conductive material, indicated by the reference character 27.

In either case, the phosphorescent material forming the phosphorescent layer 25 is formed of a phosphorescent compound which exhibits proper length of persistence to give a desired level of emission in the visible spectrum, such as the phosphorescent compounds composed of zinc sulphide, copper activated with a chloride coactivator, one satisfactory example of which is the phosphorescent compound commercially designated P-7 phosphor.

The photovaltaic semi-conductor 26 is provided, when desired, to be activated by photons generated when light impinges upon the phosphorus compound incorporated in the semi-conductor layer, to produce further photons increasing the activation of the phosphor layer 25 to produce a higher intensity of exhibiting light responsive to the exciting radiation produced by the pencil member 11.

The photovoltaic semi-conductor layer 26 compounded with phosphorescent material may be formed of known photovoltaic semi-conductor materials, such as materials containing a cesium antimony compounnd, for example $Cs_2Sb_3$, chemically interconnected with a phosphor of zinc sulphide, copper activated with a chloride coactivator, for example the known P-7 phosphor composition, which may be deposited or formed on the reflective backing 24 by known processes such as by known oxidation-reduction processes, electroplating or electrostatic spraying, and the phosphorescent layer 25 may be superimposed on the layer 26 by known methods such as spraying or sedimentation processes.

As illustrated in FIGURE 4, the conductive reflective backing 24 is electrically connected by a lead 28 to terminals 29 while the electrically conductive transparent coating 27 on the exhibiting face of the exhibiting unit 20 is electrically connected by lead 30 and an adjustable potentiometer or variable resistance 31 to the terminals 29b and 29c of the switch 20. The movable contacts 29e and 29f are respective connected by associated leads 32 and 33 to the negative and positive terminals of a suitable direct voltage source (not shown). By this arrangement, when the switch 29 is in its normal position connecting the movable contacts 29e and 29f thereof with the terminals 29a and 29b positive votlage is applied to the transparent coating 27 and negative voltage is applied to the metallic backing 24. The light beam 12 generated by the pencil member 11 and directed through the transparent coating 27 excites the atoms of the phosphorescent material in a well-known manner to raise the electrons to quantized higher energy level orbits, after which they return to their normal lower energy level orbits, releasing energy in the form of photons in this visible spectral band of electromagnetic radiation, thus producing the observable visible light emanations from the exhibiting surface.

Amplification of the light image produced by the phosphorescent layer and improvement of the persistence thereof, is achieved by use of the photovoltaic semi-conductor layer 26, which is believed to accelerate the production of excitations and re-emmissive photons effecting persistence of the light image produced and amplification of the light intensity through greater production of re-emmissive photons responsive to the exciting radiation. By appropriate selection of phosphor composition and photovoltaic semi-conductor composition, and control of the applied voltage between the transparent conductor layer 27 serving as the anode and the cathode formed by the photovoltaic semi-conductor 26 and the conductive reflective backing 24 in contact therewith, the persistence and amplification characteristics may be varied as desired. This voltage control is achieved by appropriate adjustment of the variable resistor 31.

Erasing or extinguishing of the light image or pattern produced on the exhibiting surface is accomplished by reversing the polarity of the voltage on the anode and cathode components, as by reversing the position of the switch 29 so as to connect the positive voltage lead 33 to the terminal 29d and the negative voltage lead 32 to the terminal 29c. In one preferred embodiment, the moving contact of this reversing switch 29 may be a push button actuator which is normally biased to connect the movable contacts 29e and 29f with the terminals 29a and 29b and which is shifted to the opposite or reversing position by depression of the push button actuator. This switch may be conveniently provided on the exhibiting unit 10 as for example, adjacent one corner of the encasement frame 20.

While only two embodiments of the present invention have been particularly shown and described, it will be apparent that various modifications may be made within the spirit and scope of the invention, and it is desired, therefore, that only such limitations be placed on the invention as are imposed by the prior art and set forth in the appended claims.

What is claimed:

1. Apparatus for producing visible luminous writing, graphic patterns and like images by a source of electromagnetic radiation undergoing movement relative to an exhibiting station directed in a narrow beam along a selected propagation axis, comprising an exhibiting unit at the exhibiting station including a body defining an exhibiting surface exposed to be viewed and forming an incident surface relative to said radiation beam, said body including phosphorescent material distributed throughout the same to be locally excited by said radiation beam and produce localized visible light for a selected persistence period at the portions thereof intercepting said radiation beam to generate visible light patterns viewable at said exhibiting surface corresponding to movement of said radiation beam upon manipulation of said source, means defining a reflective backing for said body generally paralleling said incident surface to reflect incident radiation transmitted through said body back through the body, and said source comprising an elongated, substantially pencil shaped member of narrow cross-section having lens means therein in the form of a bead for producing said beam of electromagnetic radiation in a narrow concentrated beam and directing the same along an axis substantially paralleling the longitudinal axis of said member.

2. Apparatus as defined in claim 1, wherein substantially pencil-shaped member includes a lamp generating radiation in at least portions of the visible spectrum including radiation capable of exciting said phosphorescent material to produce visible light, said lamp being positioned closely adjacent said bead.

3. Apparatus as defined in claim 2, wherein said substantially pencil-shaped member includes an aperture at one end thereof said lens means being a spherical body and positioned adjacent said aperture between said aperture and said lamp for concentrating light from said lamp in a narrow beam aligned with the axis of said member and directed through said aperture along said axis.

4. Apparatus as defined in claim 1, wherein the phosphorescent material of said exhibiting unit is in the form of a first substantially planiform layer of phosphorescent material substantially coextensive with said unit, said unit including a second layer of photovoltaic semi-conductor material with incorporated phosphorescent material substantially coextensive with and disposed in contact with a rear surface of said first layer opposite said incident surface, said reflective backing being electrically conductive and overlying a rear surface of said second layer opposite the surface contacting said first layer, a transparent electrically conductive coating overlying the incident surface of said first layer, and means for supplying direct current voltages of selected amplitude and polarities to said backing and said conductive coating to enhance light production in said exhibiting unit responsive to said radiation beam.

5. Apparatus as defined in claim 4, wherein said exhibiting unit includes variable resistor means electrically connected in the voltage supply to at least one of said backing and said coating to vary the amplitude of the voltages applied thereto and thereby control amplification of light intensity generated in the exhibiting unit body responsive to said radiation beam.

6. Apparatus as defined in claim 5, wherein said exhibiting unit includes reversing switch means connected between said backing and conductive coating and the voltage supply therefor for reversing the polarity of the voltages applied thereto erase the luminous image produced by said body.

7. Apparatus as defined in claim 1, wherein said exhibiting unit includes reversing switch means connected between said backing and conductive coating and the voltage supply therefor for reversing the polarity of the voltages applied thereto to erase the luminous image produced by said body.

8. Apparatus as defined in claim 6, wherein substantially pencil-shaped member includes a lamp generating radiation in at least portions of the visible spectrum including radiation capable of exciting said phosphorescent material to produce visible light.

9. Apparatus as defined in claim 8, wherein said substantially pencil-shaped member includes an aperture at one end thereof and lens means adjacent said aperture between said aperture and said lamp for concentrating light from said lamp in a narrow beam aligned with the axis of said member and directed through said aperture along said axis.

10. The apparatus of claim 1 wherein the source of electromagnetic radiation is hand held and manipulated and said pencil shaped member of narrow cross section is sized to be held in the hand of an operator.

11. Apparatus for producing visible luminous writing, graphic patterns and like images by a source of elecromagnetic radiation undergoing movement relative to an exhibiting station directed in a narrow beam along a selected propagation axis, comprising an exhibiting unit at the exhibiting station including a body defining an exhibiting surface exposed to be viewed and forming an incident surface relative to said radiation beam, said body including phosphorescent material distributed throughout the same to be locally excited by said radiation beam and produce localized visible light for a selected persistence period at the portions thereof intercepting said radiation beam to generate visible light patterns viewable at said exhibiting surface corresponding to movement of said radiation beam upon manipulation of said source, means defining a reflective backing for said body generally paralleling said incident surface to reflect incident radiation transmitted through said body back through the body, a layer of photovoltaic semiconductor material with incorporated phosphorescent material disposed in substantially coextensive contact with the rear surface of said body between said body and said reflective layer to amplify the intensity of said light patterns produced in said body, and said source comprising an elongated, substantially pencil-shaped member of narrow cross-section having means therein for producing said beam of electromagnetic radiation and directing the same along an axis substantially paralleling the longitudinal axis of said member.

12. The apparatus of claim 11 including said means for producing a beam being a lens in the form of a bead to produce a narrow concentrated beam of electromagnetic radiation.

13. The apparatus of claim 12, wherein substantially pencil-shaped member includes a lamp generating radiation in at least portions of the visible spectrum including radiation capable of exciting said phosphorescent material to produce visible light, said lamp being positioned closely adjacent said bead.

14. The apparatus as defined in claim 12, wherein said substantially pencil-shaped member includes an aperture at one end thereof, said lens means being a spherical body and positioned adjacent said aperture between said aperture and said lamp for concentrating light from said lamp in a narrow beam aligned with the axis of said member and directed through said aperture along said axis.

References Cited

UNITED STATES PATENTS

| | | | |
|---|---|---|---|
| 1,383,082 | 6/1921 | Dodds | 40—134 |
| 3,033,073 | 5/1962 | Shuttleworth | 313—94 X |
| 3,064,133 | 11/1962 | Murr et al. | 250—213 |
| 3,071,708 | 1/1963 | Stanavage. | |
| 3,152,222 | 10/1964 | Loebner. | |
| 3,290,537 | 12/1966 | Logan. | |

EUGENE R. CAPOZIO, *Primary Examiner.*

RICHARD CARTER, *Assistant Examiner.*

U.S. Cl. X.R.

35—66; 178—18; 250—213; 313—108

PO-1050
(5/69)

UNITED STATES PATENT OFFICE
CERTIFICATE OF CORRECTION

Patent No. 3,443,332      Dated May 13, 1969

Inventor(s) Alexander C. CHRISTY

It is certified that error appears in the above-identified patent and that said Letters Patent are hereby corrected as shown below:

Column 5, claim 7, line 1, change "1" to -- 4 --.

SIGNED AND
SEALED
JAN 27 1970

(SEAL)
Attest:

Edward M. Fletcher, Jr.
Attesting Officer

WILLIAM E. SCHUYLER, JR.
Commissioner of Patents